United States Patent [19]
Williamsson

[11] Patent Number: 6,080,308
[45] Date of Patent: Jun. 27, 2000

[54] WATER PURIFICATION ARRANGEMENT FOR DRAIN WATER CATCH BASINS

[75] Inventor: Per Åke Williamsson, Södertälje, Sweden

[73] Assignee: Ecodrain AB, Sweden

[21] Appl. No.: 09/213,097

[22] Filed: Dec. 17, 1998

[30] Foreign Application Priority Data

Oct. 26, 1998 [SE] Sweden ................. 9803665-0

[51] Int. Cl.[7] ................................................ E03F 5/04
[52] U.S. Cl. ....................... 210/164; 210/170; 210/247; 210/908
[58] Field of Search ................. 210/163–166, 210/232, 247, 249, 251, 305–307, 908, 170; 4/289–291

[56] References Cited

U.S. PATENT DOCUMENTS

| | | |
|---|---|---|
| 243,648 | 6/1881 | Stimpson . |
| 5,297,367 | 3/1994 | Sainz . |
| 5,458,769 | 10/1995 | Johannessen . |
| 5,531,888 | 7/1996 | Geiger et al. . |
| 5,650,065 | 7/1997 | Sewell . |
| 5,730,878 | 3/1998 | Rice . |
| 5,733,444 | 3/1998 | Johnson . |
| 5,744,048 | 4/1998 | Stetler . |
| 5,846,410 | 12/1998 | Elofsson . |

FOREIGN PATENT DOCUMENTS

WO 96/02709  2/1996  WIPO .

*Primary Examiner*—David A. Simmons
*Assistant Examiner*—Fred Prince
*Attorney, Agent, or Firm*—Fasth Law Offices; Rolf Fasth

[57] ABSTRACT

An arrangement (2) for cleansing polluted water that enters into a catch basin includes a container (4), which is intended to be arranged in the catch basin and which has an upper, substantially horizontal intake opening (30) for receiving the downward moving polluted water, and a pollution-absorbing material (6) that is arranged in the container for cleansing polluted water that flows from the intake opening. The arrangement further includes a particle separator (8) which in arranged above the container (4) and which forms an outer surface (18) with a shape such that solid particles in the incoming, polluted water are diverted by the outer surface so that the particles fall outside of the intake opening (30) of the container, whereas water is led in under the particle separator (8) by surface wetting to the outer surface and falls down into the container via its intake opening.

10 Claims, 3 Drawing Sheets

WATER PURIFICATION ARRANGEMENT FOR DRAIN WATER CATCH BASINS

The present invention relates to an arrangement for cleansing polluted water that enters into a drain water catch basin, comprising a container that is intended to be arranged in the catch basin and that has at least one upper, substantially horizontal intake opening to receive downward flowing, polluted water, and at least one lower outlet opening for evacuating the cleansed water from the container. A pollution-absorbing material is arranged in the container for cleansing the polluted water that flows from the intake opening to the outlet opening.

Water purification arrangements of this type have been used foremost for primary purification of surface water, is which often contains environmentally harmful pollutants in both solid and liquid form, such as heavy metals, rubber particles, oil and chemicals. Such pollutants put an unfavorable load on the purification plants and disrupt the intended function of the chemical and biological purification steps. In the case where the polluted water is not connected to a purification plant, the soil, ground water, and recipients are impacted in an unfavorable manner. When water purification arrangements of this type are installed in drain water catch basins for surface water, there is the advantage that the said pollutants can be separated from the surface water even before it reaches the purification plant. Additionally, separated pollutants in the form of oil residues and certain chemicals can advantageously be converted into environmentally friendly substances with the help of bacteria cultures in the pollution-absorbing material, for example, bark.

One problem in this context is, however, that solid particles such as gravel, trash, leaves and the like, which fall down into the drain water catch basin, can, in exposed positions, completely clog the intake opening of the arrangement's container relatively quickly, sometimes in only a few weeks after installation of the water purification arrangement. Since, for reasons of cost, the arrangement cannot be cleaned or provided with a new pollution-absorbing material more often than approximately three times per year, there is therefore a risk that the arrangement in certain drain water catch basins will be useless a large part of the year.

Another problem is that the flow of water down into the drain water catch basin usually varies greatly. The water flow can therefore be significantly larger than the normal flow that the water purification arrangement is dimensioned to receive, which can lead to pollutants that have been absorbed by the pollution-absorbing material being purged out of it. Moreover, the water flow can sometimes be extremely much larger than the said normal flow, which can lead to flooding due to the arrangement reducing the flow capacity of the drain water catch basin.

The goal of the present invention is to provide an improved water purification arrangement that solves the above-mentioned problems found in water purification arrangements of this specific type.

This goal is achieved by means of an arrangement of the type described in the introduction which is characterized by including a particle separator, which is arranged above the container and that forms an outer surface having such a shape that solid particles in the incoming cleansed water are diverted by the outer wall so that the particles fall outside of the intake opening, whereas water is led due to surface wetting in under the particle separator and falls down into the container via its intake opening. In this way, clogging of the intake opening of the container by coarse, solid particles in a for of trash, branches, larger leaves and the like, which fall down into the drain water catch basin, is efficiently avoided. Thanks to the surface wetting of the water on the outer surface of the container, an incoming normal flow of polluted water can be lead in under the container where the water is collected, so that it ultimately releases from the outer surface and falls down through the intake opening of the container.

The outer surface of the particle separator advantageously extends horizontally, seen from above, and covers the horizontal intake opening of the container, which has the effect that an extremely large incoming flow of water, which is substantially not influenced by the surface wetting on the outer surface, for the most part falls outside the intake opening of the container. In this way, the particle separator acts as a flow regulator in the sense that only a predetermined maximum water flow can flow into the container, regardless of how large the flow of water is that enters the drain water catch basin. The arrangement thus avoids pollutants that have been absorbed by the pollution-absorbing material in the container being flushed out of it during abnormally large incoming flows of water. The risk of flooding is also reduced, since large flows of water can pass outside of the container in the drain water catch basin.

According to one general aspect of the invention, at least a part of the outer service of the particle separator is curved, preferably from the top of the particle separator downward and in under the particle separator, which has the result that the normal flow of water can easily flow along the curved outer surface due to surface wetting, with no risk of the water releasing from the outer service.

According to one embodiment of the invention, the outer surface of the particle separator is substantially cylindrical, which makes the particle separator simple and economical to manufacture. The cylindrical outer surface may suitably be delimited by two end flanges on the particle separator, in order to prevent incoming water from running off of the outer surface of the cylinder at its ed walls.

According to an alternative embodiment of the invention, the outer surface of the particle separator is substantially spherical.

A relatively coarse strainer, suitably in the shape of a slanted grate, is advantageously arranged for separating relatively large, light particles such as pieces of plastic foil, leaves and the like, from incoming, polluted water in at least one passage for the polluted water that is formed between the container and the portion of the outer surface of the particle separator that curves in under the particle separator. Such large, light particles can be carried along with the water that flows due to surface wetting against the said portion of the outer surface and are thus separated by the coarse strainer. A relatively fine strainer can be arranged in the area of the intake opening of the container for separating relatively small, light particles that can pass through the said coarse strainer.

The arrangement according to the invention may comprise a funnel for receiving polluted water and for distributing the received water centrally above the particle separator, whereby the funnel is arranged to be fastened on an existing intake grate of the drain water catch basin in which the arrangement is provided. The funnel is suitably made of an elastic material, for example, rubber, and can be shaped to have a rectangular cross-section go as to fit possibly rectangular intake grates or, alternatively, with a circular cross-section in order to fit circular intake grates. The intake grates of drain water catch basins are normally removable in order to make it possible to pump out the catch basins regularly, which has the advantage that the funnel can also be removed from the drain water catch basin when the intake grate is taken away. In some cases, the particle separator and the container, which normally are formed as a unit, may be secured in the funnel, whereby the entire arrangement according to the invention is removed from the drain water catch basin when the intake grate in removed.

BRIEF DESCRIPTION OF THE DRAWINGS

The invention in described in greater detail below with reference to the accompanying drawings, in which:

FIG. 1 shows an arrangement 2 according to one embodiment of the invention that includes two main parts, namely, a container 4 for a pollution-absorbing material 6, for example, bark, and a particle separator 8 that is arranged above the container 4. The particle separator 8 comprises a cylindrical wall 10 and two end walls 12, 14, whereby the walls 10, 12 and 14 delimit a chamber 16. The cylindrical wall 10 has a cylindrical outer surface 18 that is axially delimited by two flanges 20, 22, which form radial extensions of the end walls 12, 14. Located centrally in the lower part of the particle separator 8 there is a vertical passage 24 in the wall 10. The end walls 12, 14 each have an oval hole 26 and 28, respectively, whereby the one hole 26 extends below the lower limit of the second hole 28.

Figure 1:
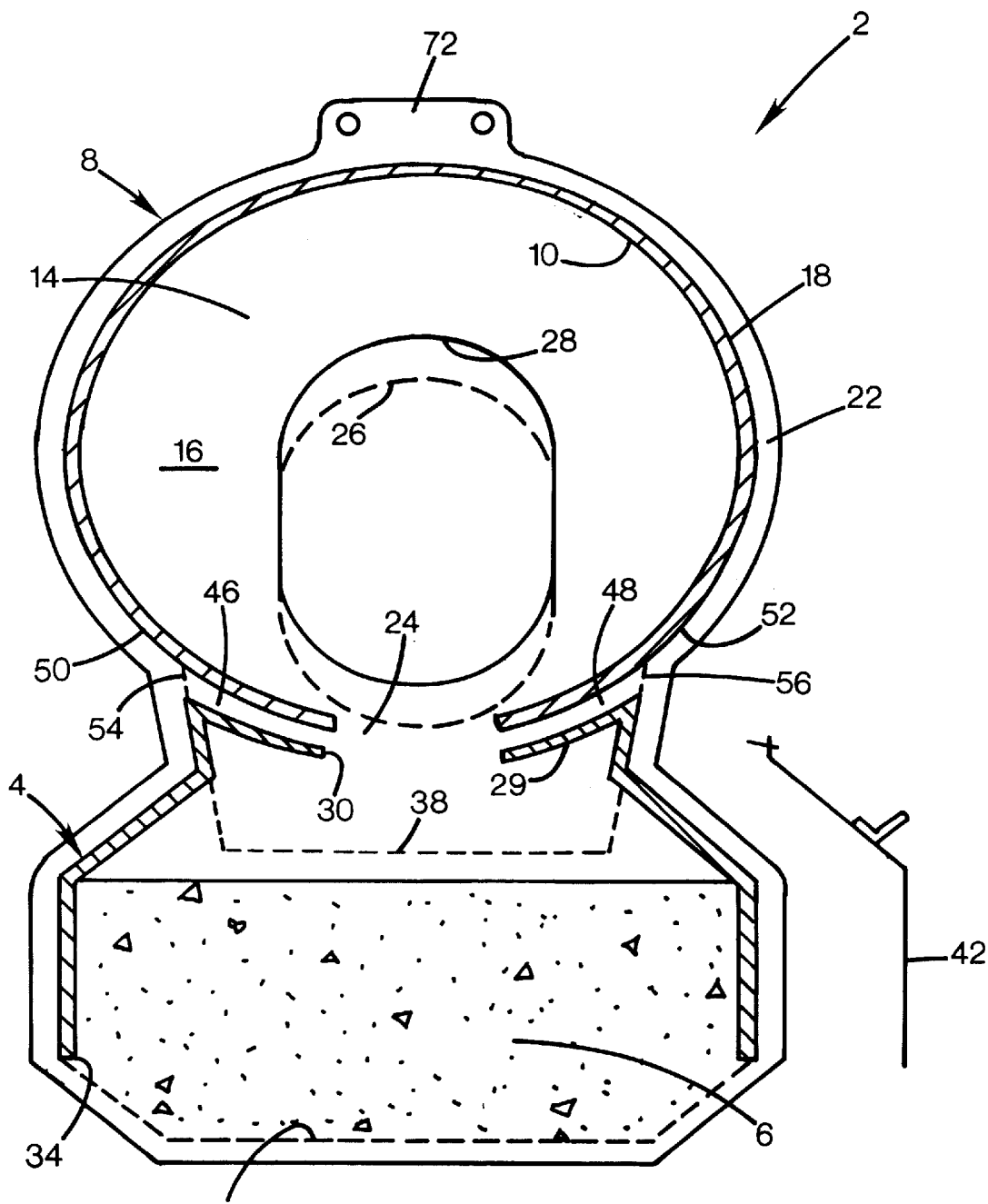
FIG. 1 shows a view of a vertical cross-section through one embodiment of the arrangement according to the invention.
Figure 2:
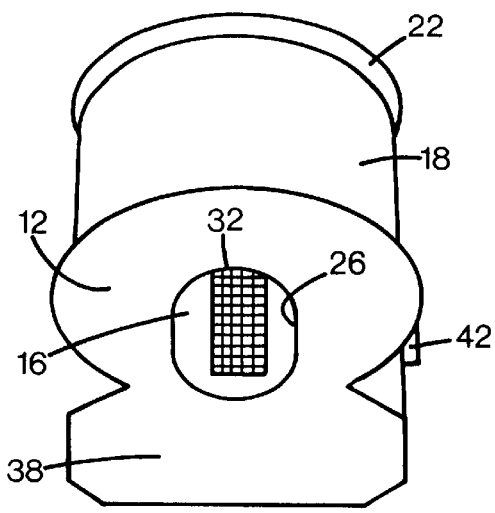
FIG. 2 shows a view obliquely from above of the front portion of the embodiment according to FIG. 1.
Figure 3:
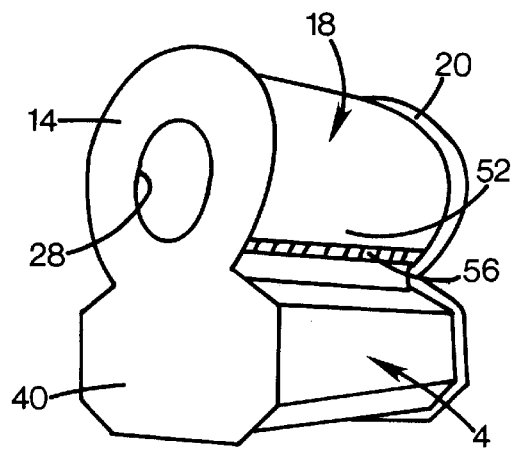
FIG. 3 shows a perspective view of the rear portion of the embodiment according to FIG. 1.
Figure 4:
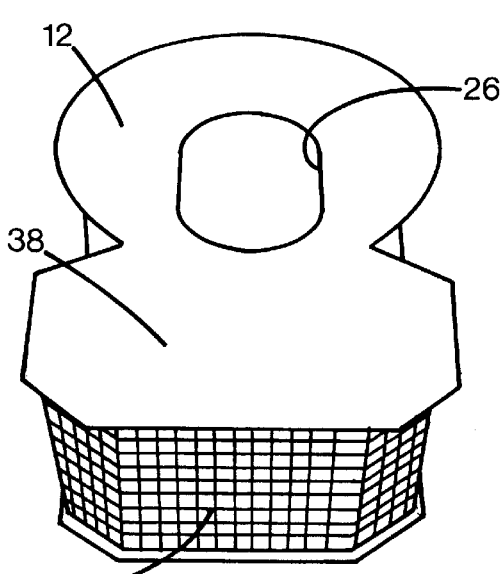
FIG. 4 shows a view obliquely from above of the front portion of the embodiment according to FIG. 1.
Figure 5:
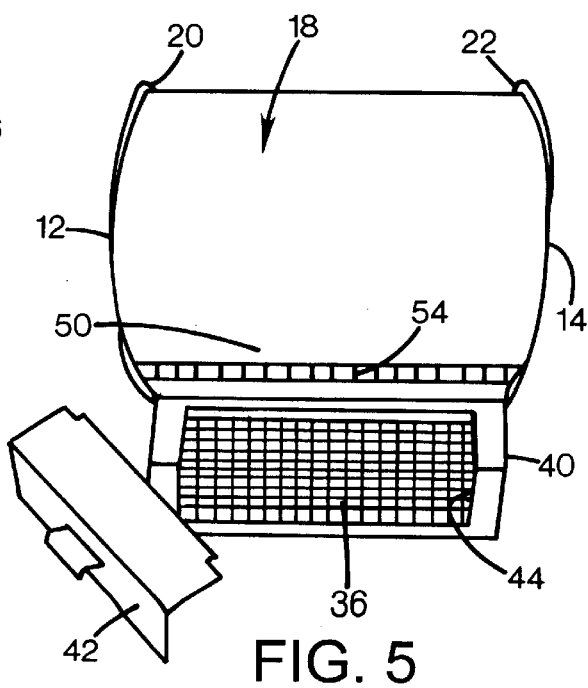
FIG. 5 shows a side view of the embodiment according to FIG. 1 with a cover removed.

The container 4 forms a ring-shaped flange 28, which delimits a horizontal upper intake opening 30, under which is arranged a removable, fine strainer 32. A fine strainer 36, which supports the pollution-absorbing material 6, is arranged on the container 4 and extends above a lower outlet opening 34 of the container. Two side walls 38, 40 of the container 4 transition seamlessly into the end walls 12, 14 of the particle separator 8, whereby the particle separator 8 and the container 4 form a single unit. Located between the side walls 38, 40 of the container 4 is a removable cover 42, which covers a side opening 44 into the interior of the container 4 (see FIG. 5).

On either side of the particle separator 8 in formed a passage 46 and 48, respectively, between the container 4 and the respective portions 50, 52 of the cylindrical outer surface 18 that curves inwards under the particle separator 8. Positioned in the passages 46, 48 are coarse strainers 54, 56, respectively, in the form of grates, which extend downward from the outer surface 18 towards the container 4.

Figure 6:
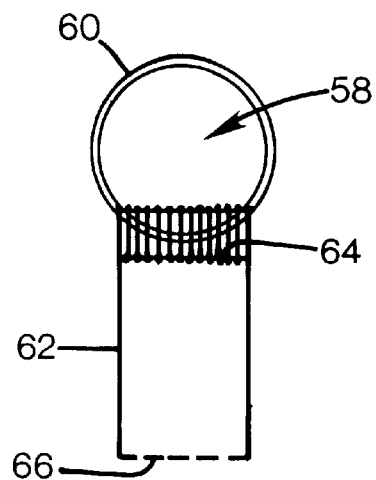
FIG. 6 shows another embodiment of the arrangement according to the invention.

FIG. 6 shows schematically an alternative embodiment of the invention, in which the particle separator 58 is shaped to have a spherical outer surface 60; the container 62 for the pollution-absorbing material is cylindrical; and the coarse strainer 64 in the passage between the spherical outer surface 60 and the container 4 is ring-shaped. At its lower end the cylindrical container 62 is provided with a grate 66.

Figure 7:
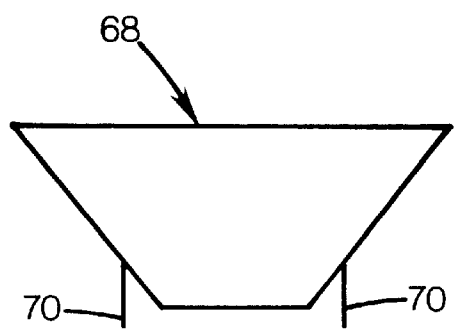
FIG. 7 shows a funnel in the arrangement according to the invention for receiving and distributing polluted water.
Figure 8:
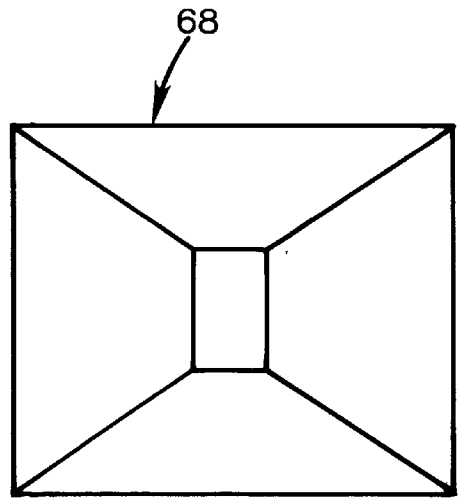
FIG. 8 shows a view from above of the funnel according to FIG. 7.
Figure 9:
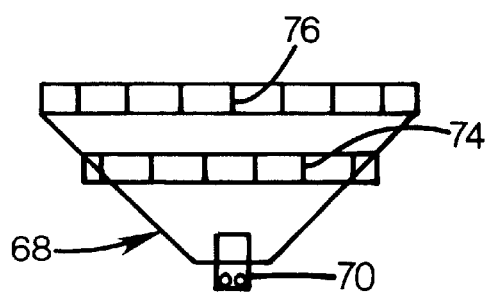
FIG. 9 schematically illustrates how the funnel can be attached to different sizes of intake grates for drain water catch basins.

In FIGS. 7 and 8 in shown an elastic funnel 68, for example, made of rubber, with a square cross section. The funnel 68 is provided with fastening members 70, which are intended to be attached to suitable fastening members 72 on the upper part of the particle separator 8. (The funnel 68 can naturally also be attached to the particle separator 58 as shown in FIG. 6 by means of suitable fasteners.) The funnel 68 is intended to be fastened onto existing square intake grates 74, 76 of different sizes by cutting the funnel 68 80 that it fits the current intake grate, as is indicated in FIG. 9. In this way, the entire arrangement according to the invention, including the funnel 68, will hang from the intake grate 74, 76 down into the drain water catch basin. Alternatively, the funnel 68 may be shaped to have a circular cross-section in order to fit any circular intake grates.

The arrangement according to the invention works in the following way, with reference to the embodiment according to FIGS. 1–5. Aided by the funnel 68, the arrangement 2 is attached to the intake grate 74, 76 to the drain water catch basin in which the incoming, polluted surface water is to be cleansed. The intake grate 74, 76 is then put on the drain water catch basin so that the arrangement 2 hangs down into it. Polluted water that has a flow of normal size down through the intake grate 74, 76 is collected by the funnel 68 and is distributed centrally onto the upper part of the cylindrical outer surface 18 of the particle separator 8. The water flows farther down following the cylindrical outer surface 18 and, by surface wetting on the parts 50 and 52, into the passages 46 and 48 through the coarse strainers 54 and 56. The flanges 20 and 22 then hinder the water from running onto the end walls 12 and 14. Solid, heavy particles in the incoming surface water fall away from the cylindrical outer surface 18 outside of the passages 46 and 56, down onto the bottom of the catch basin, whereas solid, relatively large, light particles, which are carried along by the water into the passages 46 and 48, are separated by the coarse strainers 54 and 56. Water that has passed the coarse strainers 54 and 56 separates from the parts 50 and 52 of the cylindrical outer surface 18 at the passage 24 and falls down through the intake opening 30 of the container 4, through the fine strainer 32, which separates any solid, relatively small, light particles. The absorbing material 6 absorbs any oil or chemical residues in the water passing it. Finally, the cleansed water flows out from the container 4 via the fine strainer 36 and into the outlet opening 34.

If the flow of the surface water through the intake grate 74, 76 is greater than the normal flow that the arrangement 2 is dimensioned to receive, then the excess water will release from the cylindrical outer surface 18 of the particle separator 8 and will fall down outside of the passages 46 and 48. A maximum water flow will flow through the passages 46 and 48 and fill the container 4 above the absorbing material 6, since this material does not have the capacity to receive such a maximum flow. As a result, the water above the absorbing material 6 will rise up through the lower vertical passage 24 in the cylindrical wall 10 and will flow out from the chamber of the particle separator 8 via the lower hole 26, whereby solid, relatively small, light particles are carried from the fine strainer 32 by the flowing water that in flowing on it. The fine strainer 32 is thus flushed automatically during those instances when the flow of the surface water in greater than normal.

The arrangement according to the invention has been described above in the context of installing the arrangement in a drain water catch basin for surface water. It can, however, alternatively be used in other applications where one wishes to purify flowing, polluted water. The expression "drain water catch basin" should therefore be interpreted broadly and to comprise equivalent elements that form a space for a substantially vertically flowing stream of water, for example, wells in laundry facilities, industrial catch basins, rain gutters from roofs, and the like.

I claim:

1. An arrangement for cleansing polluted water that enters into a catch basin, comprising:
   a container disposed in the catch basin, the container having an upper horizontal intake opening defined therein for receiving a downwardly moving polluted water, the container having a lower outlet opening for evacuating cleansed water from the container;
   a pollution-absorbing material disposed in the container for cleansing polluted water flowing from the intake opening to the outlet opening;
   a particle separator disposed above the container, the particle separator forming an outer surface having a shape so that solid particles contained in polluted water are being diverted by the outer surface so that the solid particles fall outside of the intake opening of the container and water is being led in under the particle separator by surface wetting to the outer surface and falls down into the container via the intake opening.

2. An arrangement according to claim 1 wherein the outer surface of the particle separator has a horizontal extension that covers the intake opening of the container.

3. An arrangement according to claim 2 wherein a portion of the outer surface of the particle separator is curved.

4. An arrangement according to claim 3 wherein the outer surface of the particle separator is curved downwardly and in under the particle separator.

5. An arrangement according to claim 4 wherein the outer surface of the particle separator is curved from a top portion of the particle separator downwardly and in under the particle separator.

6. An arrangement according to claim 5 wherein the outer surface of the particle separator is substantially cylindrical.

7. An arrangement according to claim 6 wherein the cylindrical outer surface is delimited by two end flanges on the particle separator.

8. An arrangement according to claim 5 wherein the outer surface of the particle separator is substantially spherical.

9. An arrangement according to claim 8 wherein a passage for polluted water is formed between the container and the a portion of the outer surface of the particle separator that curves in under the particle separator and a strainer for separating large, light particles from the cleansed water is disposed in the passage.

10. An arrangement according to claim 1 wherein the arrangement further comprises a funnel for receiving polluted water and distributing the received water centrally above and onto the particle separator, whichin the funnel is attached to an intake grate of the catch basin.

* * * * *